United States Patent
Menke

(10) Patent No.: US 7,323,927 B2
(45) Date of Patent: Jan. 29, 2008

(54) INTEGRATED CHARGE PUMP

(75) Inventor: Manfred Menke, Wolfratshausen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/318,059

(22) Filed: Dec. 19, 2005

(65) Prior Publication Data

US 2006/0170485 A1   Aug. 3, 2006

(30) Foreign Application Priority Data

Dec. 17, 2004   (DE) ................ 10 2004 060 969

(51) Int. Cl.
G05F 1/10   (2006.01)
(52) U.S. Cl. .................................. 327/536
(58) Field of Classification Search ............. 327/535, 327/536, 537
See application file for complete search history.

(56) References Cited

U.S. PATENT DOCUMENTS

| | | | |
|---|---|---|---|
| 4,106,086 A | | 8/1978 | Holbrook et al. |
| 4,897,774 A | | 1/1990 | Bingham et al. |
| 5,712,777 A | | 1/1998 | Nicollini et al. |
| 6,288,601 B1 | * | 9/2001 | Tomishima ................. 327/536 |
| 6,486,729 B2 | * | 11/2002 | Imamiya ..................... 327/536 |
| 6,603,346 B2 | * | 8/2003 | Sawada et al. ............. 327/536 |
| 6,621,326 B1 | * | 9/2003 | Le ............................. 327/536 |
| 6,642,773 B2 | * | 11/2003 | Lin et al. ................... 327/536 |
| 6,642,775 B2 | * | 11/2003 | Imamiya ..................... 327/536 |
| 7,157,960 B2 | * | 1/2007 | Kim et al. .................. 327/536 |

FOREIGN PATENT DOCUMENTS

DE     2758508     7/1978

OTHER PUBLICATIONS

Chi-Chang Wang and Jiin-Chuan Wu, "Efficiency Improvement in Charge Pump Circuits", IEEE Journal of Solid-State Circuits, vol. 32, No. 6, Jun. 1997, pp. 852-860.

* cited by examiner

Primary Examiner—Jeffrey Zweizig
(74) Attorney, Agent, or Firm—Patterson & Sheridan, L.L.P.

(57) ABSTRACT

An integrated charge pump is provided, comprising: a pump capacitor having a first terminal and a second terminal; a control unit, which operates the charge pump in an alternation between a first phase and a second phase; a first switching device in order to charge the pump capacitor with a pump voltage in the first phase; a second switching device in order to pull the potential of the first terminal to a predetermined potential in the second phase, and in order to connect the second terminal of the pump capacitor to an output node, the second switching device having a first transistor in order to connect the second terminal of the pump capacitor to the output node, a substrate terminal of the first transistor being fixedly connected to the output node; and the second switching device pulling the first terminal to the predetermined potential with a gradient, the gradient being chosen such that at no point in time is a diode breakdown voltage exceeded in the first transistor.

16 Claims, 1 Drawing Sheet

INTEGRATED CHARGE PUMP

CROSS-REFERENCE TO RELATED APPLICATIONS

This application claims foreign priority benefits under 35 U.S.C. §119 to co-pending German patent application number DE 10 2004 060 969.1-34, filed 17 Dec. 2004. This related patent application is herein incorporated by reference in its entirety.

BACKGROUND OF THE INVENTION

1. Field of the Invention

The invention relates to an integrated charge pump, in particular for use in integrated circuits with reduced current consumption.

2. Description of the Related Art

Integrated circuits usually require, in addition to the external supply voltage, further internal voltages which do not correspond to the external supply voltage and are either larger or smaller than the external supply voltage or are provided with a different sign. In order to convert the external supply voltage into the respective internal supply voltage, a suitable voltage supply source is provided, which, for voltage conversion purposes, usually requires an additional operating current, e.g., for the voltage regulation, which additional operating current becomes apparent in the current balance of the entire integrated circuit. This additional current is essentially constant irrespective of what supply current is drawn at the output of the voltage supply source. In low-power applications, in which the voltage supply sources are operated both in a normal operating mode and in a standby operating mode, different supply currents are drawn from the voltage supply source depending on the operating mode. The efficiency of the voltage supply source deteriorates as the supply current decreases since, as mentioned previously, the additional current required, e.g., for the voltage regulation remains constant. Therefore, it is important, particularly in low-power applications, to optimize the efficiency of such voltage supply sources.

In the case of charge pumps, the supply current for the supply sources is determined to a considerable extent by the switching of transistors for changing over between a first and a second cycle. Thus, by way of example, switching devices are provided in a charge pump in order to optimize the operation of the charge pump, e.g., a switching device which, depending on the operating state, connects the substrate (back gate) of a switching transistor to the respective lowest or respective highest potential.

SUMMARY OF THE INVENTION

It is an object of the present invention to provide a charge pump which can be operated efficiently and with a low supply current/total current ratio.

One aspect of the present invention provides an integrated charge pump comprising a pump capacitor having a first terminal and a second terminal. The charge pump furthermore has a control unit, by means of which the charge pump can be operated in an alternation between a first phase and a second phase. A first switching device is provided to charge the pump capacitor with a pump voltage in the first phase, and a second switching device is provided to pull the potential of the first terminal to a predetermined potential in the second phase and to connect the second terminal of the pump capacitor to an output node. The second switching device has a first transistor to connect the second terminal of the pump capacitor to the output node. Furthermore, a substrate terminal of the first transistor is fixedly connected to the output line. The second switching device pulls the first terminal to the predetermined potential with a voltage change gradient, so that at no point in time is a diode breakdown voltage exceeded in the first transistor.

The charge pump according to the invention is distinguished by the fact that the first transistor, which connects the second terminal of the pump capacitor to the output line, has a substrate terminal fixedly connected to the output line. This distinguishes the charge pump according to the invention from charge pumps according to the prior art, in which the corresponding transistor with a comparable function has a substrate terminal which, depending on the phase, is alternately connected to the output line and to a potential present at the second terminal of the pump capacitor in order to apply the respective highest or lowest occurring potential in the entire charge pump circuit to the substrate terminal of the first transistor, depending on the conductivity type of the first transistor. To protect the diode breakdown voltage from being exceeded in the first transistor when the predetermined potential is present at the first terminal of the pump capacitor, the predetermined potential is applied to the first terminal of the pump capacitor with a gradient that is chosen such that at no point in time is the diode breakdown voltage exceeded in the first transistor. In this way, it is possible to significantly reduce the outlay on circuitry for such a charge pump, since, by way of example, transistors for switching the substrate terminal of the first transistor, which are usually switched synchronously with the alternation between the first and second phases, could be obviated.

This can be achieved in accordance with one embodiment such that the second switching device has a second transistor, by means of which the first terminal is connected to the predetermined potential via a resistance in the second phase. The resistance may be wholly or partly formed by the forward resistance of the second transistor.

In accordance with one embodiment of the invention, the channel width of the first transistor may be greater than the channel width of the second transistor, so that the voltage drop across the channel of the first transistor in the second phase can be kept as small as desired by way of the width ratio of first to second transistor and can thus be kept below the diode breakdown voltage.

Preferably, the first switching device may have a third transistor in order to connect the second terminal of the pump capacitor to a charge potential in the first phase, the first and third transistors being driven with the same control signal, and the first and third transistors having an inverse switching characteristic with respect to one another. What is furthermore achieved in this way is that the circuit of the integrated charge pump can be designed with a reduced number of transistors since there is no need to separately provide drive signals for the first and third transistors.

It may furthermore be provided that the first switching device has a fourth transistor, which is connected in series with the third transistor, and the fourth transistor is closed only when the first transistor is fully open. This avoids the situation in which, in the event of simultaneous switching of the first and third transistors, the switching characteristic curves overlap in such a way that a charge flows away from the output node into the voltage source for the supply potential and thus reduces the pump effect. In particular, the fourth transistor may be driven in such a way that it is opened at the same time as or before the first transistor is closed.

It may furthermore be provided that the control unit receives a clock signal at an input and generates control signals for the first and second switching devices from the clock signal. In particular, a level converter may be provided to fix a level of the control signal for the first and third transistors genrally at an output potential of the output line.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
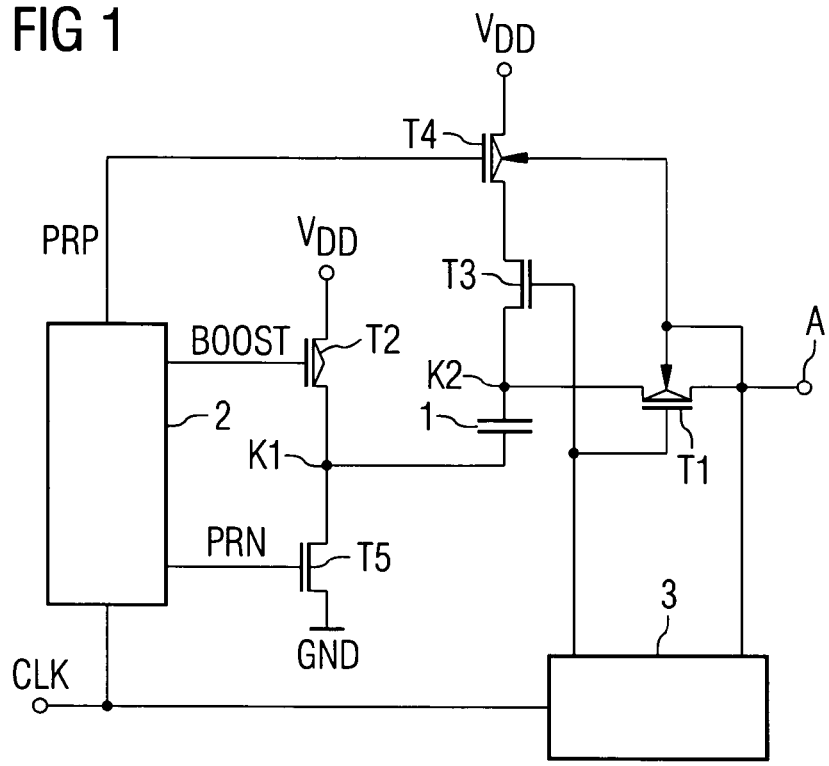
FIG. 1 shows a circuit diagram of an integrated charge pump according to the invention in accordance with a preferred embodiment.

FIG. 1 illustrates a circuit diagram of a preferred embodiment of the integrated charge pump according to the invention. The charge pump has a pump capacitor 1, which is charged in a first phase and raises the potential at an output node A in a second phase, so that a potential greater than the supply voltage potential $V_{DD}$ is achieved. This is effected by means of a number of transistors $T_1$, $T_2$, $T_3$, $T_4$, $T_5$, which are driven with corresponding drive signals obtained from a clock signal CLK. The drive signals are generated in a control unit 2, as is described in greater detail later.

The pump capacitor 1 is connected to a first node $K_1$ by a first terminal and to a second node $K_2$ by a second terminal. The second node $K_2$ is connected to a first terminal of a first transistor $T_1$, the second terminal of which is connected to the output node A. The second node $K_2$ is likewise connected to a first terminal of a third transistor $T_3$, the second terminal of which is connected to a first terminal of a fourth transistor $T_4$. A second terminal of the fourth transistor $T_4$ is connected to a first high supply voltage potential $V_{DD}$ of a voltage supply. The first node $K_1$ is connected to a first terminal of a second transistor $T_2$, the second terminal of which is connected to the first high supply voltage potential $V_{DD}$ or alternatively to a further high supply potential. The first node $K_1$ is furthermore connected to a first terminal of a fifth transistor $T_5$, the second terminal of which is connected to a second low supply voltage potential, preferably a ground potential GND.

The first, second and fourth transistors $T_1$, $T_2$, $T_4$ have an inverse switching behavior with respect to the third and fifth transistors $T_3$, $T_5$. In the example illustrated, the first, second and fourth transistors $T_1$, $T_2$ and $T_4$ are of a p conductivity type and the third and fifth transistors $T_3$, $T_5$ are of an n conductivity type. These form a charge pump that generates an increased output potential in comparison with the first high supply voltage potential $V_{DD}$. As an alternative, the conductivity types of the transistors may be reversed, and the polarity of the supply voltages may be interchanged, thereby forming a charge pump for a reduced output voltage in comparison with the lowest potential provided.

In order to avoid the presence of a diode breakdown voltage at the first transistor $T_1$, the substrate (back gate) of the first transistor $T_1$ is connected to the output node A, so that the substrate is always maintained at the highest possible potential in the exemplary embodiment shown. If the first transistor $T_1$ is formed as an n-channel field effect transistor, the substrate is connected to the lowest potential of the entire charge pump.

The control terminals (gate terminals) of the first and third transistors $T_1$, $T_3$ are connected to an output of a level converter 3, which receives a provided clock signal CLK for controlling the cyclic first and second phases. The level converter 3 converts a level (high level) of the clock signal CLK, so that this level in this state is at the level of the output node. In the example shown, the charge pump serves to provide, at the output node A, an increased potential in comparison with the first high supply voltage $V_{DD}$. If the clock signal is at a high level, then the potential of the high level is adapted to the increased potential of the output node A, so that the first and third transistors $T_1$, $T_3$ acquire as the high level a potential corresponding to the increased potential at the output node A, so that the first and third transistors $T_1$, $T_3$ are driven in such a way that they are fully open and fully turned off, respectively, in accordance with the high level present. If a high level is present at the transistor $T_1$, then the latter turns off fully if the gate voltage is greater than the potential at the output node A reduced by the threshold voltage of the first transistor $T_1$.

Such a charge pump is operated in two phases. In a first phase, the pump capacitor 1 is charged by the transistors $T_3$, $T_4$ and $T_5$ being closed, so that, from the first high supply voltage potential $V_{DD}$, the second node $K_2$ and, from the second low supply voltage potential GND, the first node $K_1$ correspondingly charge the pump capacitor 1. In a second phase, the third, fourth and fifth transistors $T_3$, $T_4$ and $T_5$ are correspondingly opened. With the opening of the transistor $T_3$, the transistor $T_1$ is also closed before the transistor $T_2$ is closed. The second transistor $T_2$ is then turned on, so that the potential of the first node is raised and thus raises the potential of the second node $K_2$ to the same extent. With the transistor $T_1$ already switched on, what is then achieved in the second phase is that the stored charge of the pump capacitor 1 can flow away to the output node A, so that a charge voltage which is increased in comparison with the first high supply voltage potential $V_{DD}$ builds up there.

If the potential at the node $K_1$ is raised significantly more rapidly than the charge can flow away from the node $K_2$ via the first transistor $T_1$ to the output node A, then the highest voltage present at the first transistor $T_1$ is at the drain terminal of the first transistor $T_1$, which voltage can then exceed the diode breakdown voltage. This may have the effect that a diode current flows between the drain terminal and the substrate of the first transistor $T_1$, which may lead to a latch-up effect. For this reason, it is provided according to the invention that the terminal of the pump capacitor 1 at the first node $K_1$ is not connected directly and as rapidly as possible to the first high supply voltage potential $V_{DD}$ via the second transistor $T_2$, so that the voltage at the second node considerably exceeds the voltage present at the output node A. Instead, the potential at the first node $K_1$ is permitted to rise with a predetermined maximum voltage change gradient. The gradient is dependent inter alia on the forward resistance of the first transistor $T_1$, which determines how rapidly a charge potential on the second node $K_2$ can flow away to the output node A. In order to avoid a latch-up effect at the first transistor $T_1$, it is necessary not to permit the voltage difference between the second node $K_2$ and the output node A to become greater than the threshold voltage of the pn junction that forms between the drain and the substrate terminal.

The second transistor $T_2$ is preferably dimensioned in such a way that the first high supply voltage potential $V_{DD}$ is applied to the first node $K_1$ in the closed state of the second transistor $T_2$ with the forward resistance inherent to the second transistor $T_2$. Through a suitable dimensioning in particular of the channel width of the first and second transistors $T_1$, $T_2$, it is possible to ensure that the charge potential at the second node $K_2$ does not exceed the threshold voltage with regard to the potential at the output node A. This makes it possible for the substrate terminal of the first transistor $T_1$ to be fixedly connected to the output node A, since there is no need to provide further additional driving for avoiding a latch-up effect. In particular, the first and second transistors $T_1$, $T_2$ are to be dimensioned in such a way that the channel width of the first transistor is significantly greater than the channel width of the second transistor, preferably greater by approximately a factor of 10.

The first transistor $T_1$ and the third transistor $T_3$ are preferably chosen with an inverse switching behavior and driven with the same drive signal. In this way, the first transistor $T_1$ is closed while the third transistor $T_3$ is open, and vice versa. In order to prevent a current from being able to flow momentarily between the first high supply potential $V_{DD}$ and the output node A while the first and third transistors $T_1$, $T_3$ are in transition between two states, the fourth transistor $T_4$ is provided, which is closed only when the first transistor $T_1$ is certainly open.

Figure 2:
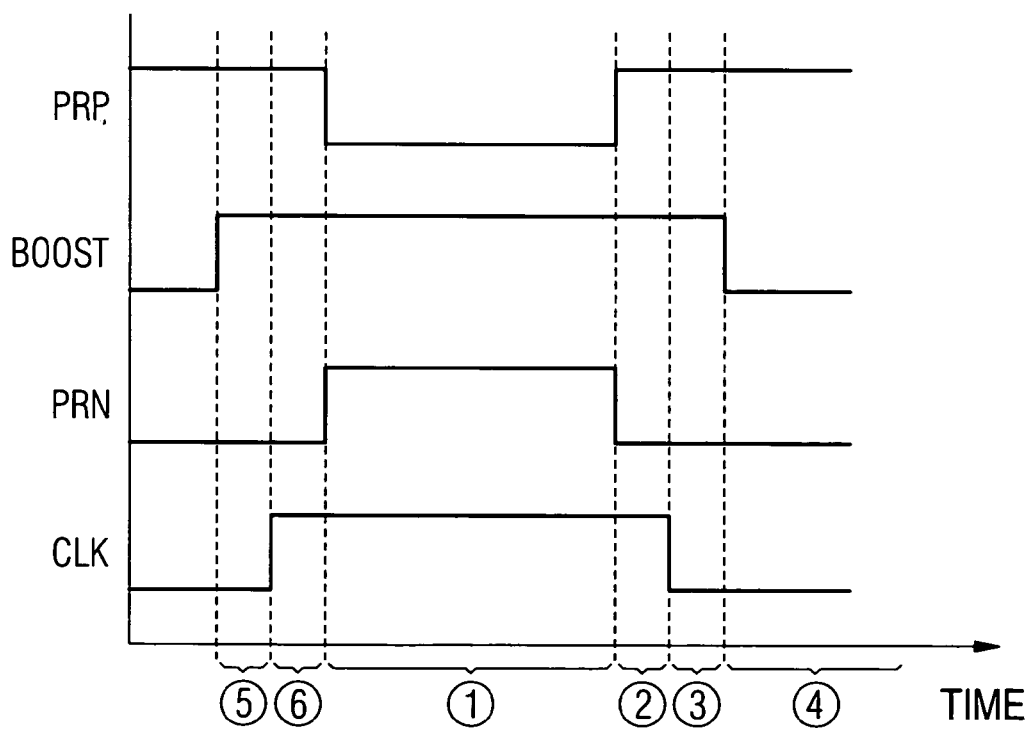
FIG. 2 shows a signal timing diagram for the drive signals of the transistors of the charge pump shown in FIG. 1.

FIG. 2 illustrates a signal timing diagram for the clock signal CLK and the drive signals PRP, BOOST and PRN, which are provided by the control unit 2. An operating cycle of the charge pump is subdivided into six time windows (identified by encircled numbers in FIG. 2) in which different levels of the drive signals are in each case present at the transistors $T_1$ to $T_5$. The PRP signal is applied to a control input of the fourth transistor $T_4$, the PRN signal is applied to a control input of the fifth transistor $T_5$, and the BOOST signal is applied to a control input of the second transistor $T_2$. The clock signal CLK provided is present at the control inputs (gate terminals) of the first and third transistors $T_1$, $T_3$, in the case of which clock signal a level corresponding to the state of the clock signal CLK is put at the potential of the output node A. The first time window is characterized by a low level of the PRP signal, a high level of the PRN signal, a high level of the BOOST signal and a high level of the clock signal CLK. The first time window begins with a change in level of the PRP signal and of the PRN signal. As a result, the fourth and fifth transistors $T_4$ and $T_5$ are turned on (closed) and, on account of the high level of the clock signal CLK, the third transistor $T_3$ is likewise turned on, so that the first node $K_1$ is connected to the second low supply potential GND, and the second node $K_2$ is connected to the first high supply potential $V_{DD}$. The pump capacitor 1 is thereby charged until the fourth and fifth transistors $T_4$, $T_5$ are opened at the end of the first time window by a change in level of the PRP signal and of the PRN signal, so that the charging of the pump capacitor 1 is ended.

In a second time window extending from the end of the first time window up to a change in level of the clock signal, provision is made for ensuring that no charge can flow away from the output node A to the first high supply potential $V_{DD}$ if the first, third and fourth transistors $T_1$, $T_3$, $T_4$ are open in a transition phase. The provision of the second time window ensures that the fourth transistor is reliably closed before the first transistor $T_1$ is closed and the third transistor $T_3$ is opened as a result of the change in level of the clock signal CLK in a subsequent third time window.

The third time window serves to ensure that the first transistor $T_1$ is completely closed, that is to say that the forward resistance of the first transistor is as low as possible, before the second transistor $T_2$ is turned on in a subsequent fourth time window by virtue of the low level of the BOOST signal, and the potential of the first node $K_1$ is raised in the direction of the first high supply potential $V_{DD}$. As mentioned previously, the channel widths of the first and second transistors $T_1$ and $T_2$ should be chosen such that the channel width of the first transistor $T_1$ is significantly greater than that of the second transistor $T_2$. As an alternative, it may also be provided that the BOOST signal is not provided as a digital drive signal but rather as an analog drive signal, and during the BOOST phase, that is to say during the fourth time window, the second transistor $T_2$ is not completely turned on, but rather is turned on only such that, with a closed first transistor $T_1$, the voltage difference between the second node $K_2$ and the output node A does not exceed the threshold voltage (diode forward voltage), in order to preclude a latch-up effect.

As an alternative, an additional resistance (not shown) may also be inserted between the first high supply potential $V_{DD}$ and the first node $K_1$ in order to limit the charge flow to the first terminal of the pump capacitor 1.

In the fifth time window, which follows the fourth time window during cyclic operation, the second transistor $T_2$ is switched off again. The latter is preferably opened (or switched-off) before the transistor $T_1$ in order to avoid a high voltage jump at the second node $K_2$ if the first transistor $T_1$ were opened first. In a subsequent sixth time window, the first transistor $T_1$ is switched off, such that it is not possible for a voltage jump to occur at the second node $K_2$ since the parasitic capacitances between the first and second nodes are large in comparison with the overcoupling capacitance between the control terminals of the first and third transistors $T_1$, $T_3$ and the second node.

One advantage of the charge pump circuit proposed is that the highest voltage that occurs in the circuit is essentially the potential at the output node A, so that the well terminals (substrate terminals) of the first and fourth transistors $T_1$, $T_4$ can be fixedly connected to the output node. Furthermore, the first and third transistors $T_1$, $T_3$ can be driven with the same drive signal, so that instead of two separate level converters only one level converter 3 is required, which drives the two control terminals of the first and third transistors $T_1$ and $T_3$. The second, third, fifth and sixth time windows should be chosen to be as small as possible in order that the charging time of the pump capacitor is not restricted unnecessarily, but large enough to achieve the effects described.

While the foregoing is directed to embodiments of the present invention, other and further embodiments of the invention may be devised without departing from the basic scope thereof, and the scope thereof is determined by the claims that follow.

What is claimed is:

1. An integrated charge pump, comprising:
   a pump capacitor having a first terminal and a second terminal;
   a control unit for operating the charge pump alternately between a first phase and a second phase;
   a first switching device connected to charge the pump capacitor with a pump voltage in the first phase; and
   a second switching device configured to pull the potential of the first terminal of the pump capacitor to a predetermined potential in the second phase and to connect the second terminal of the pump capacitor to an output node;

wherein the second switching device includes a first transistor connected between the second terminal of the pump capacitor and the output node;
wherein a substrate terminal of the first transistor is fixedly connected to the output node;
wherein the second switching device pulls the first terminal of the pump capacitor to the predetermined potential with a voltage change gradient, the gradient being selected such that a diode breakdown voltage is not exceeded in the first transistor;
wherein the second switching device has a second transistor which connects the first terminal of the pump capacitor to the predetermined potential via a resistance in the second phase; and
wherein a channel width of the first transistor is greater than a channel width of the second transistor, wherein a voltage drop across the channel of the first transistor in the second phase remains below the diode breakdown voltage of the first transistor.

2. The charge pump of claim 1, wherein the resistance is at least partly formed by a forward resistance of the second transistor.

3. The charge pump of claim 1, wherein the channel width of the first transistor is greater than the channel width of the second transistor at least by a factor of about 10.

4. The charge pump of claim 1, wherein the first and second transistors have an identical conductivity type.

5. An integrated charge pump comprising:
a pump capacitor having a first terminal and a second terminal;
a control unit for operating the charge pump alternately between a first phase and a second phase;
a first switching device connected to charge the pump capacitor with a pump voltage in the first phase; and
a second switching device configured to pull the potential of the first terminal of the pump capacitor to a predetermined potential in the second phase and to connect the second terminal of the pump capacitor to an output node;
wherein the second switching device includes a first transistor connected between the second terminal of the pump capacitor and the output node;
wherein a substrate terminal of the first transistor is fixedly connected to the output node;
wherein the second switching device pulls the first terminal of the pump capacitor to the predetermined potential with a voltage change gradient, the gradient being selected such that a diode breakdown voltage is not exceeded in the first transistor; and
wherein the second switching device has a second transistor which connects the first terminal of the pump capacitor to the predetermined potential via a resistance in the second phase; and
wherein the first switching device includes a third transistor for connecting the second terminal of the pump capacitor to a charge potential in the first phase, and wherein the first and third transistors are driven with a same control signal, and wherein the first and third transistors have an inverse switching characteristic with respect to each other.

6. The charge pump of claim 5, wherein the first switching device has a fourth transistor connected in series with the third transistor, and wherein the fourth transistor is closed only when the first transistor is open.

7. The charge pump of claim 6, wherein the fourth transistor is opened at the same time as or before the first transistor is closed.

8. The charge pump of claim 7, wherein the control unit receives a clock signal at an input and generates control signals for the first and second switching devices from the clock signal.

9. The charge pump of claim 7, further comprising:
a level converter for fixing a level of the control signal for the first and third transistors at about an output potential of the output node.

10. An integrated charge pump, comprising:
a pump capacitor having a first terminal and a second terminal;
a first switching device to selectively connect the first terminal of the pump capacitor to a first supply voltage potential and the second terminal of the pump capacitor a second supply voltage potential; and
a second switching device comprising:
a first transistor selectively connected between the second terminal of the pump capacitor and an output node, the first transistor having a substrate terminal fixedly connected to the output node; and
a second transistor selectively connected between the first terminal and the second supply voltage potential;
wherein the second switching device pulls the first terminal of the pump capacitor to a predetermined potential with a voltage change gradient such that a diode breakdown voltage is not exceeded in the first transistor;
wherein the first switching device comprises:
a third transistor connected between the first terminal of the pump capacitor to the first supply voltage potential; and
a fourth transistor connected between the second terminal of the pump capacitor and the second supply voltage potential, wherein the transistors of the first switching device and the transistors of the second switching device are opposite conductivity types having inverse switching behavior;
wherein the second switching device further comprises a fifth transistor connected in series between the third transistor and the second supply voltage potential; and
a control unit configured to receive a clock signal and to selectively activate the first switching device and the second switching device, respectively.

11. The charge pump of claim 10, wherein control unit is configured to deactivate the fifth transistor before activating the first transistor.

12. The charge pump of claim 10, further comprising:
a level converter connected to receive the clock signal and connected to the output node to provide respective control signals to the first transistor and the third transistor, wherein the respective control signals are at about an output potential at the output node.

13. The charge pump of claim 10, wherein second switching device provides a resistance between the first terminal and the first second supply voltage potential.

14. An integrated charge pump, comprising:
a pump capacitor having a first terminal and a second terminal;
a first switching device to selectively connect the first terminal of the pump capacitor to a first supply voltage potential and the second terminal of the pump capacitor a second supply voltage potential; and
a second switching device comprising:
a first transistor selectively connected between the second terminal of the pump capacitor and an output node, the first transistor having a substrate terminal fixedly connected to the output node; and a second transistor selectively connected between the first terminal and the second supply voltage potential;

wherein the second switching device pulls the first terminal of the pump capacitor to a predetermined potential with a voltage change gradient such that a diode breakdown voltage is not exceeded in the first transistor;

wherein a channel width of the first transistor is greater than a channel width of the second transistor, wherein a voltage drop across the channel of the first transistor remains below a diode breakdown voltage of the first transistor; and a control unit configured to receive a clock signal and to selectively activate the first switching device and the second switching device, respectively.

15. The charge pump of claim 14, wherein the channel width of the first transistor is greater than the channel width of the second transistor at least by a factor of about 10.

16. A method for operating an integrated charge pump, comprising:

providing respective control signals from a control unit to a first switching device and a second switching device respectively connected to a pump capacitor, wherein the control unit is connected to receive a clock signal and operate the charge pump alternately in a first phase and a second phase; and wherein, in the first phase, the pump capacitor is charged by activating the first switching device to connect the pump capacitor between a first supply voltage potential and a second voltage potential;

wherein, in the second phase, the second switching device is activated to pull a potential of the first terminal of the pump capacitor to a predetermined potential and to connect the second terminal of the pump capacitor to an output node, wherein a first transistor of the second switching device is connected between the second terminal of the pump capacitor and the output node, wherein a substrate terminal of the first transistor is fixedly connected to the output node, wherein the second switching device pulls the potential of the first terminal of the pump capacitor to the predetermined potential with a voltage change gradient, the gradient being selected such that a diode breakdown voltage is not exceeded in the first transistor, wherein the second switching device has a second transistor which connects the first terminal of the pump capacitor to the predetermined potential via a resistance in the second phase; and wherein a channel width of the first transistor is greater than a channel width of the second transistor, wherein a voltage drop across the channel of the first transistor in the second phase remains below the diode breakdown voltage of the first transistor.

* * * * *

UNITED STATES PATENT AND TRADEMARK OFFICE
CERTIFICATE OF CORRECTION

PATENT NO. : 7,323,927 B2　　　　　　　　　　　　　　　　　　　　　　　　　　Page 1 of 1
APPLICATION NO. : 11/318059
DATED : January 29, 2008
INVENTOR(S) : Manfred Menke It is certified that error appears in the above-identified patent and that said Letters Patent is hereby corrected as shown below:

In claim 9, at Column 8, Line 5, please delete "7" and insert --8--.

Signed and Sealed this

Twelfth Day of August, 2008

JON W. DUDAS
*Director of the United States Patent and Trademark Office*